P. CAMPBELL AND W. J. BANKS.
PISTON, PISTON VALVE, OR THE LIKE.
APPLICATION FILED AUG. 9, 1920.

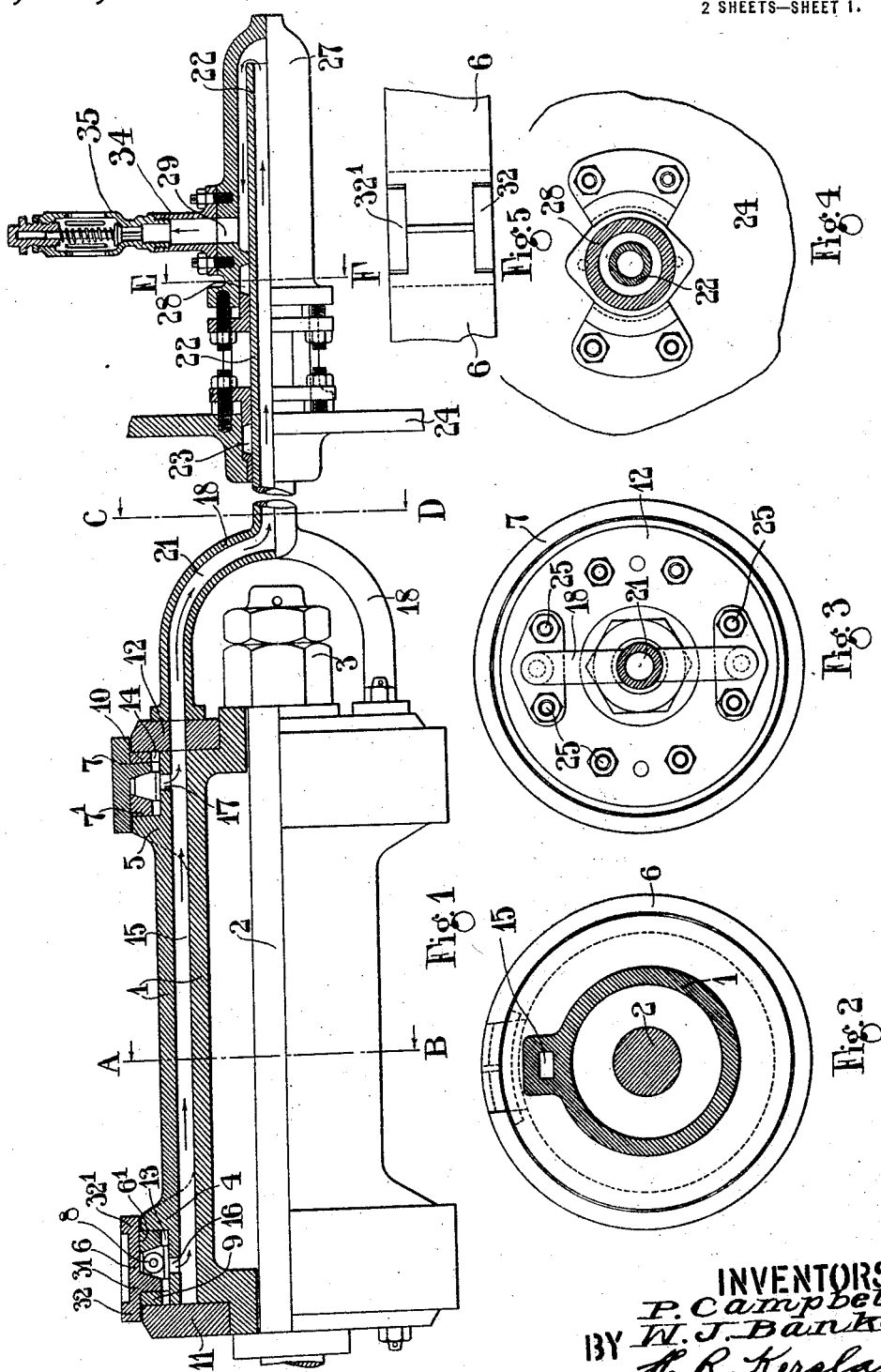

1,406,536.

Patented Feb. 14, 1922.
2 SHEETS—SHEET 2.

INVENTOR
P. Campbell,
W. J. Banks,
BY H. R. Kerslake
ATTORNEY

UNITED STATES PATENT OFFICE.

PETER CAMPBELL, OF BRISTOL, AND WILLIAM JAMES BANKS, OF HOTWELLS, BRISTOL, ENGLAND.

PISTON, PISTON VALVE, OR THE LIKE.

1,406,536.     Specification of Letters Patent.     Patented Feb. 14, 1922.

Application filed August 9, 1920. Serial No. 402,384.

(GRANTED UNDER THE PROVISIONS OF THE ACT OF MARCH 3, 1921, 41 STAT. L., 1313.)

*To all whom it may concern:*

Be it known that we, PETER CAMPBELL, a subject of the King of Great Britain and Ireland, and residing at 19 Oakfield Road, Clifton, in the city and county of Bristol, England, and WILLIAM JAMES BANKS, a subject of the King of Great Britain and Ireland, and residing at 8 Oldfield Place, Hotwells, Bristol, in the county of Bristol, England, have invented certain new and useful Improvements in Pistons, Piston Valves or the like, (for which we have filed applications in England July 29th, 1914, and Nov. 3, 1915,) of which the following is a specification.

This invention relates to improvements in pistons, piston valves or the like, and has for its principal object the reduction of the friction between the working surfaces to a minimum while reducing leakage of the pressure fluid to a minimum.

In order that the full benefit of the relief of pressure between the working surfaces may be obtained, it is necessary that this relief be applied to a piston, piston valve or the like in which the metallic packing is so constructed that in the case of a steam engine, for instance, a minimum of steam can pass from the pressure side of the cylinder and past the packing to the opposite side of the piston and to the space behind the packing.

The invention principally consists in placing the space behind the metallic packing in controlled access to the atmosphere for the purpose of preventing accumulation of pressure therein.

According to the present invention the member carrying the metallic packing is constructed with a passage or passages which are, on the one hand, connected with the space at the back of the packing, and on the other hand are connected with a tubular connection which gives controlled access to the atmosphere.

In order that the invention may be better understood, reference is made by way of example to the accompanying drawings, in which:—

Figure 1 is a part sectional elevation of a piston valve for a steam engine constructed according to the invention;

Figure 2 is a section on the line A—B of Figure 1;

Figure 3 is an end elevation of the valve on the line C—D of Figure 1;

Figure 4 is a section on the line E—F of Figure 1;

Figure 5 is a front view of a joint in one of the packing rings;

Figure 8:
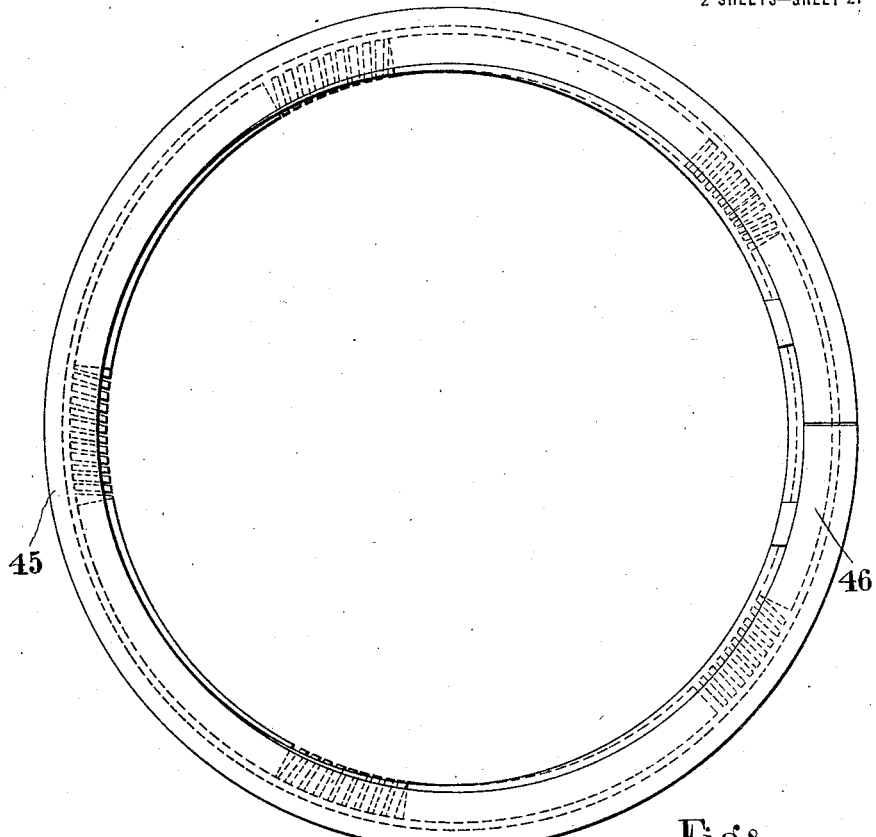
Figure 8 shows a packing ring of eccentric form.

In the drawings, Figure 1 represents a piston valve with two piston rings. 1 represents the body of the valve which is secured to the valve rod 2 by nuts 3 in the usual manner. At 4 and 5 are raised circumferential portions having recesses 13 and 14 within which the packing rings 6 and 7 are fitted, these rings being arranged with known wedging means such as the spring members 8. The wedge-shaped rings 6′ and 7′ bear against the flanges 4 and 5 respectively and also have an outward tendency against the packing rings under the action of the spring members 8. In order to ensure fair steam-tightness joint rings 9 and 10 are provided that fit between the inner portions of the main packing rings and the junk rings 11 and 12. The split in each of the packing rings 6 and 7 is preferably made steam-tight by means of the tongue-piece 31 which is provided with end lips 32 and 32′ that overhang and fit into the cut away sides of the packing ring adjacent the split. The closing of the joints between these tongue-pieces 31 and the main packing rings 6 and 7 is provided for by the peripheral surface of rings 6′, 7′, 9 and 10.

Figure 6:
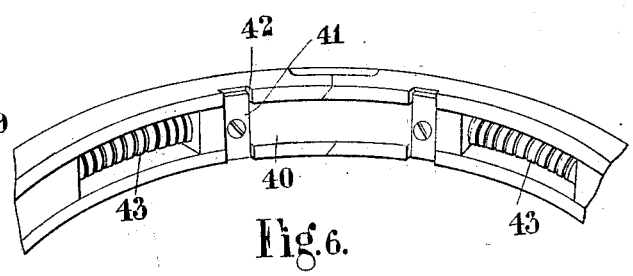
Figure 6 is a perspective view of a construction of packing ring.

In Figure 6 the perspective view of the packing shows two restraining pieces 41 which are screwed to the wedge member 40 and extend loosely into recesses 42 that are provided in the packing rings. The springs 43 force the packing outwardly in known manner by means of the wedge pieces while the expansion of the packing is limited by the said restraining pieces 41.

To compensate for the metal removed in the metallic packing rings where the restraining pieces and the tongue pieces are fitted and in order that the strength may be maintained the ring or rings are preferably made eccentrically as indicated in Figure 8. In this construction the thinner portion of the material of the ring as at 45 is diametrically opposite the split portion 46 of the ring.

Figure 7:
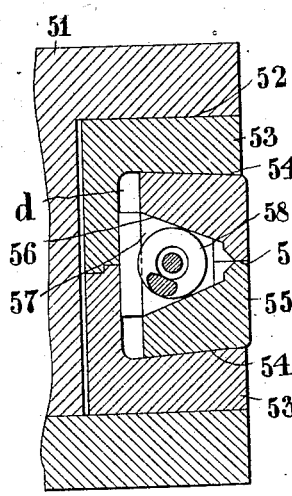
Figure 7 is a sectional view of another construction of packing ring.

In Figure 7 is shown the arrangement of packing rings. The piston or piston valve body 51 has a recess 52 within which are fitted carrier rings 53. These carriers are provided with a recess having undercut walls 54. Within the recess is a double packing ring 55 with sloping walls that engage the undercut walls of the carrier rings. The packing rings themselves have a recess with sloping sides 56 against which bear expanding wedge pieces as 57 that coact with one another by means of springs 58. The mutually adjacent surfaces 59 of the packing rings are made small in area, so that as wear takes place on the peripheral surface, the rings may be further expanded by the ready removal of the contacting surfaces at 59.

Referring to Figure 1, at one part of the cylindrical body of the valve is cast a hole or passage 15 traversing the whole length of the valve. The passage is stopped off at one end by the junk ring 11, but is continued through junk ring 12. In the recesses 13 and 14 are drilled one or more radial holes 16 and 17 so as to connect passage 15 with the enclosed annular spaces or recesses 13 and 14 below the main packing rings 6 and 7. The junk ring 12 on the outer end of the valve has fitted to it a breeches or bridge piece 18, and is secured by flanges to the said ring by two pairs of the bolts 25 that secure the said ring to the valve. This bridge member 18 is hollow, having a passage-way 21 which forms a continuity of passage 15. The passage is extended by means of a central pipe or tail piece 22 which passes through a gland 23 in the steam chest cover 24 of the engine. Beyond the cover is a tail box member 27 closed at the outer end and provided with a packed gland 28 for the hollow tail rod 22 to reciprocate through. The wall of this box is provided with a hole 29 and a pipe connection 34 for the attachment of an automatic relief valve 35.

The closed end of the box may also, if desired, be drilled and fitted with a gauge for indicating the pressure existing inside the packing rings.

The space surrounding the valve being under steam pressure during the working of the engine, there results a leakage of live steam between the packing rings 6 and 7 and the body of the piston valve. This steam pressure may eventually reach a considerable amount and without any means for relieving this pressure, an undue friction between the rings and the walls of the steam chest will arise. This undue pressure may have serious consequences, particularly in the case of large marine engines, but by the constructions described any undue pressure produced in the packing rings is automatically controlled.

In pistons or piston valves where there is a multiplicity of packing rings, the branch passages that connect with the spaces at the back of the said rings may themselves be connected with each other, the common junction passage then connecting with the main passage.

In the case of a steam piston the cylinder would be provided with a gland through which the hollow tail piece 22 can work. The piston rod itself might be provided with a passage in connection with passage 15, thus providing communication outside by the cylinder in the manner described.

The constructions hereinbefore described have the further advantage that any steam which condenses in the space at the back of the packing ring can escape.

Having now described our invention, what we claim as new and desire to secure by Letters Patent is:—

1. In combination, a metallic packing carrying member; a chamber co-acting therewith, a gland thereon, a metallic packing fitted on said member so as to leave an annular space behind the packing; a tail rod attached to said member extending through the gland, a passage through said tail rod connecting with the space behind the packing by means of a radial passage on the packing carrying member, a tail box into which the tail rod extends, and an automatic relief valve fitted to the tail box whereby the pressure accumulating behind the packing is controlled.

2. In combination, a metallic packing carrying member, a chamber co-acting therewith, a gland thereon, metallic packings fitted on said member so as to leave an annular space behind each packing, radial passages and a common connecting passage in the body of the packing carrying member, a tubular member connected to one end of the said member and extending through the gland for continuing the common passage, a tail box into which the tubular member extends and an automatic relief valve fitted to the tail box whereby the pressure accumulating behind the packings is controlled.

3. A metallic packing carrying member, metallic packings comprising elliptical metallic rings leaving an annular space behind each packing, wedge members, springs adapted to force the rings outwardly, plates carried by the wedge members for limiting the amount of expansion and tongue-pieces for covering the splits on the packing rings, in combination with a gland on the said packing carrying member, radial passages and a common connecting passage in the body of the packing carrying member, a tubular member connected to one end of the said member and extending through the gland for continuing the common passage, a tail box into which the tubular member extends and an automatic relief valve fitted to the tail box whereby the pressure accumulating behind the packings is controlled.

In testimony whereof we have signed our names to this specification.

PETER CAMPBELL.
WILLIAM JAMES BANKS.